(12) United States Patent
Multer et al.

(10) Patent No.: US 6,925,476 B1
(45) Date of Patent: Aug. 2, 2005

(54) UPDATING APPLICATION DATA INCLUDING ADDING FIRST CHANGE LOG TO AGGREAGATE CHANGE LOG COMPRISING SUMMARY OF CHANGES

(75) Inventors: David L. Multer, Santa Cruz, CA (US); Robert E. Garner, Lawrenceville, GA (US); Leighton A. Ridgard, Ellenwood, GA (US); Liam J. Stannard, Lawrenceville, GA (US); Donald W. Cash, Dunwoody, GA (US); Joseph Robertson, Winterville, GA (US)

(73) Assignee: fusionOne, Inc., San Jose, CA (US)

( * ) Notice: Subject to any disclaimer, the term of this patent is extended or adjusted under 35 U.S.C. 154(b) by 135 days.

(21) Appl. No.: 09/642,615

(22) Filed: Aug. 17, 2000

(51) Int. Cl.[7] .............................................. G06F 17/30
(52) U.S. Cl. ............................ 707/200; 707/1; 707/204
(58) Field of Search .................... 707/1–10, 104–104.1, 707/200–205, 500.1, 511–512, 100, 102; 709/200–205, 215–218, 245–248; 340/7.21; 717/172–173, 178; 345/762–763; 710/128; 714/10–16; 711/161–162

(56) References Cited

U.S. PATENT DOCUMENTS

| | | | |
|---|---|---|---|
| 5,130,993 A | 7/1992 | Gutman et al. | |
| 5,392,390 A | 2/1995 | Crozier | 395/161 |
| 5,519,606 A | 5/1996 | Frid-Nielsen et al. | 364/401 |
| 5,623,661 A | 4/1997 | Hon | |
| 5,628,005 A | 5/1997 | Hurvig | |

(Continued)

FOREIGN PATENT DOCUMENTS

| | | | | |
|---|---|---|---|---|
| EP | 0801487 A2 | 10/1997 | | |
| EP | 0 986 225 A1 | 3/2000 | | |
| EP | 1180890 | * 2/2002 | | |
| GB | 2366050 A | * 4/2004 | | 11/34 |
| JP | 11242620 | 7/1999 | | |
| JP | 11242677 | 7/1999 | | |

(Continued)

OTHER PUBLICATIONS

Paulo Batista et al. Mining web access logs of an On–line newspaper, A survey, SIGKKD Explorations, Jul. 2000, 8 pages.*

Jason Lee et al. "Monitoring daa archives for grid environments", 11th IEEE symposium on high performance distributed computing, Jul. 2002, pp1–10.*

Intellisync Email Accelerator, A detailed guide to functionality—Product functionality paper, Mar. 2004, pp 1–18.*

Internate Mail Consortium: "vCard Overview", Retrieved from the Internet: www.imc.org/pdi./vcardoverview.html, Oct. 13, 1998, 3 pages only.

Internate Mail Consortium: "vCard The Electronic Business Card," Retrieved from the Internet: www.imc.org/pdi/vcard-white.html, Jan. 1, 1997, 4 pages only.

*Primary Examiner*—Srirama Channavajjala
(74) *Attorney, Agent, or Firm*—Vierra Magen Marcus Harmon & DeNiro LLP

(57) ABSTRACT

A change log aggregation and optimization mechanism and methodology for updating and synchronizing application data and application files in a client device of a data transfer and synchronization system. The contents of a plurality of change logs reflecting the then current changes to the application data of the client device are downloaded and merged into an aggregate log. Instead of applying each change log as it is downloaded, the contents of the aggregate log, representing all changes to application data and/or application files recorded in prior change logs, are then applied to the client device to update application data and/or application files in the client device.

18 Claims, 11 Drawing Sheets

U.S. PATENT DOCUMENTS

| | | | |
|---|---|---|---|
| 5,630,081 A | 5/1997 | Rybicki et al. | 395/348 |
| 5,638,508 A * | 6/1997 | Kanai et al. | 714/20 |
| 5,649,195 A * | 7/1997 | Scott et al. | 707/201 |
| 5,666,553 A | 9/1997 | Crozier | 395/803 |
| 5,682,524 A | 10/1997 | Freund et al. | 395/605 |
| 5,684,990 A | 11/1997 | Boothby | 395/619 |
| 5,694,596 A | 12/1997 | Campbell | |
| 5,701,423 A | 12/1997 | Crozier | 395/335 |
| 5,706,509 A | 1/1998 | Man-Hak Tso | |
| 5,710,922 A | 1/1998 | Alley et al. | 395/617 |
| 5,727,202 A | 3/1998 | Kucala | 395/610 |
| 5,729,735 A * | 3/1998 | Meyering | 707/10 |
| 5,729,743 A | 3/1998 | Squibb | 395/619 |
| 5,742,792 A | 4/1998 | Yanai et al. | |
| 5,745,750 A * | 4/1998 | Porcaro | 707/102 |
| 5,745,906 A | 4/1998 | Squibb | 707/203 |
| 5,758,150 A * | 5/1998 | Bell et al. | 707/10 |
| 5,768,597 A | 6/1998 | Simm | |
| 5,771,354 A | 6/1998 | Crawford | |
| 5,778,346 A | 7/1998 | Frid-Nielsen et al. | 705/9 |
| 5,778,388 A * | 7/1998 | Kawamura et al. | 707/203 |
| 5,787,247 A | 7/1998 | Norin et al. | |
| 5,787,262 A | 7/1998 | Shakib et al. | |
| 5,809,497 A | 9/1998 | Freund et al. | |
| 5,812,773 A | 9/1998 | Norin | |
| 5,812,793 A | 9/1998 | Shakib et al. | |
| 5,832,489 A | 11/1998 | Kucala | 707/10 |
| 5,832,518 A * | 11/1998 | Mastors | 7107/202 |
| 5,832,519 A * | 11/1998 | Bowen et al. | 707/201 |
| 5,845,283 A * | 12/1998 | Williams et al. | 707/1 |
| 5,875,296 A | 2/1999 | Shi et al. | |
| 5,884,323 A | 3/1999 | Hawkins et al. | 707/201 |
| 5,884,325 A | 3/1999 | Bauer et al. | |
| 5,893,119 A | 4/1999 | Squibb | 707/203 |
| 5,897,640 A | 4/1999 | Veghte et al. | |
| 5,897,642 A | 4/1999 | Capossela et al. | |
| 5,935,262 A * | 8/1999 | Barrett et al. | 714/46 |
| 5,937,405 A | 8/1999 | Campbell | |
| 5,943,676 A | 8/1999 | Boothby | 707/201 |
| 5,961,590 A | 10/1999 | Mendez et al. | 709/206 |
| 5,968,131 A | 10/1999 | Mendez et al. | 709/246 |
| 5,974,238 A | 10/1999 | Chase, Jr. | |
| 5,974,563 A | 10/1999 | Beeler, Jr. | |
| 6,000,000 A | 12/1999 | Hawkins et al. | |
| 6,006,274 A | 12/1999 | Hawkins et al. | |
| 6,012,063 A | 1/2000 | Bodnar | |
| 6,016,478 A | 1/2000 | Zhang et al. | |
| 6,023,708 A | 2/2000 | Mendez et al. | 707/203 |
| 6,023,723 A | 2/2000 | McCormick et al. | |
| 6,034,621 A * | 3/2000 | Kaufman | 340/7.21 |
| 6,044,381 A | 3/2000 | Boothby et al. | 707/201 |
| 6,052,735 A | 4/2000 | Ulrich et al. | |
| 6,058,399 A * | 5/2000 | Morag et al. | 707/201 |
| 6,061,790 A | 5/2000 | Bodnar | |
| 6,065,018 A * | 5/2000 | Beier et al. | 707/202 |
| 6,081,900 A | 6/2000 | Subramaniam et al. | |
| 6,131,096 A | 10/2000 | Ng et al. | |
| 6,131,116 A | 10/2000 | Riggins et al. | |
| 6,141,011 A | 10/2000 | Bodnar et al. | |
| 6,141,664 A | 10/2000 | Boothby | |
| 6,151,606 A | 11/2000 | Mendez | |
| 6,182,117 B1 | 1/2001 | Christie et al. | |
| 6,202,085 B1 | 3/2001 | Benson et al. | |
| 6,205,448 B1 | 3/2001 | Kruglikov et al. | |
| 6,212,529 B1 | 4/2001 | Boothby et al. | |
| 6,216,131 B1 | 4/2001 | Liu et al. | |
| 6,219,694 B1 | 4/2001 | Lazaridis et al. | |
| 6,223,187 B1 | 4/2001 | Boothby et al. | |
| 6,226,650 B1 | 5/2001 | Mahajan et al. | |
| 6,247,135 B1 | 6/2001 | Feague | |
| 6,272,545 B1 | 8/2001 | Flanagin et al. | |
| 6,275,831 B1 | 8/2001 | Bodnar et al. | |
| 6,282,698 B1 | 8/2001 | Baker et al. | |
| 6,295,541 B1 | 9/2001 | Bodnar et al. | |
| 6,304,881 B1 | 10/2001 | Halim et al. | |
| 6,324,544 B1 | 11/2001 | Alam et al. | |
| 6,330,568 B1 | 12/2001 | Boothby et al. | |
| 6,397,351 B1 * | 5/2002 | Miller et al. | 714/13 |
| 6,401,104 B1 * | 6/2002 | LaRue et al. | 707/200 |
| 6,405,218 B1 | 6/2002 | Boothby | |
| 6,449,622 B1 | 9/2002 | LaRue et al. | |
| 6,457,062 B1 * | 9/2002 | Pivowar et al. | 709/200 |
| 6,487,560 B1 | 11/2002 | LaRue et al. | |
| 6,684,206 B2 * | 1/2004 | Chen et al. | 707/3 |
| 6,718,348 B1 * | 4/2004 | Novak et al. | 707/201 |
| 2001/0044805 A1 | 11/2001 | Multer et al. | |
| 2002/0138765 A1 * | 9/2002 | Fishman et al. | 713/201 |
| 2003/0037020 A1 * | 2/2003 | Novak et al. | 707/1 |
| 2003/0069874 A1 | 4/2003 | Hertzog et al. | |

FOREIGN PATENT DOCUMENTS

| | | | |
|---|---|---|---|
| WO | WO 97 04391 | 2/1997 | |
| WO | WO 97 41520 | 11/1997 | |
| WO | WO 98 21648 | 5/1998 | |
| WO | WO 98 54662 | 12/1998 | |
| WO | WO 99/05813 | 2/1999 | |
| WO | WO 99/06900 | 2/1999 | |
| WO | WO 99/36870 | 7/1999 | |
| WO | WO 99 40514 | 8/1999 | |
| WO | WO 99/45451 | 9/1999 | |
| WO | WO 99/45484 | 9/1999 | |
| WO | WO 99/50761 | 10/1999 | |
| WO | WO 00/11832 | 3/2000 | |
| WO | WO 00/16222 | 3/2000 | |
| WO | WO 00/29998 * | 5/2000 | 17/60 |
| WO | WO 01/71539 | 9/2001 | |

* cited by examiner

UPDATING APPLICATION DATA INCLUDING ADDING FIRST CHANGE LOG TO AGGREAGATE CHANGE LOG COMPRISING SUMMARY OF CHANGES

BACKGROUND OF THE INVENTION

1. Field of the Invention

The invention relates to the transference of data between two systems independent of the form in which the data is kept on the respective systems, and in particular to providing an efficient means of communicating data between systems and devices.

2. Description of the Related Art

The growth of computing-related devices has not been limited to personal computers or workstations. The number of personal computing devices has grown substantially in both type and format. Small, hand-held computers carry a multitude of contact, personal, document, and other information and are sophisticated enough to allow a user to fax, send e-mails, and communicate in other ways wirelessly. Even advanced cellular phones carry enough memory and processing power to store contact information, surf the web, and provide text messaging. Along with the growth in the sophistication of these devices, the need to transfer information between them has grown significantly as well.

With a multitude of different device types on the market, keeping information between the different devices synchronized has become increasingly problematic. For example, if an individual keeps a calendar of information on a personal computer in his or her office using a particular personal information manager application, the individual would generally like to have the same information available in a cellular phone, hand-held organizer, and perhaps a home personal computer. The individual may additionally have a notebook computer which requires synchronizing file data such as presentations or working documents between the notebook and the office computer.

Until now, synchronization between both documents and personal information managers has occurred through direct connection between the devices, and generally directly between applications such as a personal information manager in one device and a personal information manager in another device or using an intermediary sync-mapping program.

One example of this is the prevalent use of the 3Com Palm® OS-based organizer, such as the 3Com Palm® series of computing devices, which uses its own calendaring system, yet lets users synchronize the data therein with a variety of different personal information manager software packages, such as Symantec's ACT!™, Microsoft's Outlook®, and other systems. In this example, an intermediary synchronization program such as Puma Technology, Inc.'s Intellisync® is required. Intellisync® is an application program which runs on both the hand-held device and the computer which stores the information data and maps data systems between non-uniform data records.

In other cases, direct transfer between applications such as transfer between Microsoft's Outlook® computer-based client and Microsoft's Windows CE "Pocket Outlook" application, is possible. Nevertheless, in both cases, synchronization occurs through direct connection between a personal computer and the personal computing device. While this connection is generally via a cable directly connecting, for example, a Palm® device in a cradle to the personal computer, the connection may be wireless as well.

One component of these synchronization systems is that the synchronization process must be able to delineate between when changes are made to specific databases and must make a decision about whether to replace the changed field. Normally, this is measured by a change in one database, and no-change in a second database. In some cases, both databases will have changed between syncs. In this case, the sync operation must determine which of the two changes, which has been made is to "win" and replace the other during the sync. Generally, this determinant of whether a conflict exists allows some means for letting the user resolve the conflict.

In a technical sense, synchronization in this manner is generally accomplished by the copying of full records between systems. At some level, a ell, user is generally required to map data fields from one application to another and specify which data fields are assigned to which corresponding field in a different device. Less mapping is required where developers more robustly support various platforms of applications.

In many instances, the data to be synchronized is generally in the form of text data such as records of addresses, contact information, calendar information, notes and other types of contact information. In certain instances, data to be synchronized will be binary format of executable files or word processor-specific documents. In many cases where document synchronization is required, the synchronization routine simply determines whether or not the documents in question have changed, and uses a time-based representation to determine which of the two files is newer, and replaces the older file with the newer file to achieve synchronization, as long as the older of the two files was in fact not changed. This is the model used in the familiar "Briefcase" function in Microsoft Windows-based systems. If both files have changed, then the synchronization routine presents the option of conflict resolution to the user.

Generally, such synchronization schemes are relatively inefficient since they require full bandwidth of the document or binary file to be transferred via the synchronization link. In addition, a change log is typically generated with each synchronization operation to record the changes in any given data record. In a situation where a large number of change logs have been generated (and stored in a server's memory), the sequence of downloading and applying each change log often results in the unnecessary download of data. A separate transaction is required for each occurrence of an item record in the change log sequence and it is possible for the same field in a record to be updated many times during a single synchronization operation.

Accordingly, there is a need for a change log aggregation and optimization mechanism that will more efficiently utilize memory storage space and speed up the synchronization process.

SUMMARY OF THE INVENTION

The invention, roughly described, provides a method and apparatus for merging the contents of a plurality of change logs into an aggregate log in a download-and-apply sequence of a client device to update application data in the client device of a data transfer and synchronization system. Redundant changes in multiple change logs are eliminated and files and records of the application data can thus be synchronized and updated more efficiently via a single transaction.

In one aspect, the invention provides a method for updating application data in a client device of a data transfer which may include the steps of: downloading a first change log of a plurality of change logs from a server system, where each of the plurality of change logs reflects changes to the application data; adding the first change log to an aggregate log; deleting the first change log; repeating the downloading, adding, and deleting steps for a next change log of the plurality of change logs until no additional change logs exist; and applying the aggregate log to the application data to update the application data.

The step of adding or merging the plurality of change logs to the aggregate log may further comprise the steps of: retrieving information for a valid item of the application data; updating a map of the aggregate log; writing the item to the aggregate log; updating the location of the valid item in the map; and repeating the previous steps for all remaining valid items of the current change log being rolled into the aggregate log.

In a further aspect, the invention comprises a method for combining changes in a plurality of accumulated change logs into an aggregate log. The method may include the steps of: creating an aggregate log; retrieving the contents of a current change log; adding the contents of the current change log to the aggregate log; deleting the current change log; and repeating the previous steps until no additional change logs exist. In particular, said step of adding or rolling the content of the change logs into the aggregate log may comprise the steps of: retrieving the contents of a plurality of items of the application data; updating a map of the items; updating the aggregate log; updating the location of respective items in the map; and compacting the aggregate log if a compact threshold is exceeded.

In a further aspect, the invention may comprise an apparatus for updating the application data in a client device of a data transfer and synchronization system. The apparatus may comprise: a downloading routine for iteratively retrieving a plurality of change logs from a server system where each of the plurality of change logs reflect the then current changes to the application data; a merging routine for iteratively aggregating the contents of the plurality of change logs to an aggregate change log; a change log deletion routine for iteratively deleting the plurality of change logs; and an updating routine for applying the contents of the aggregate log to the application data to update the application data.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Figure 1:
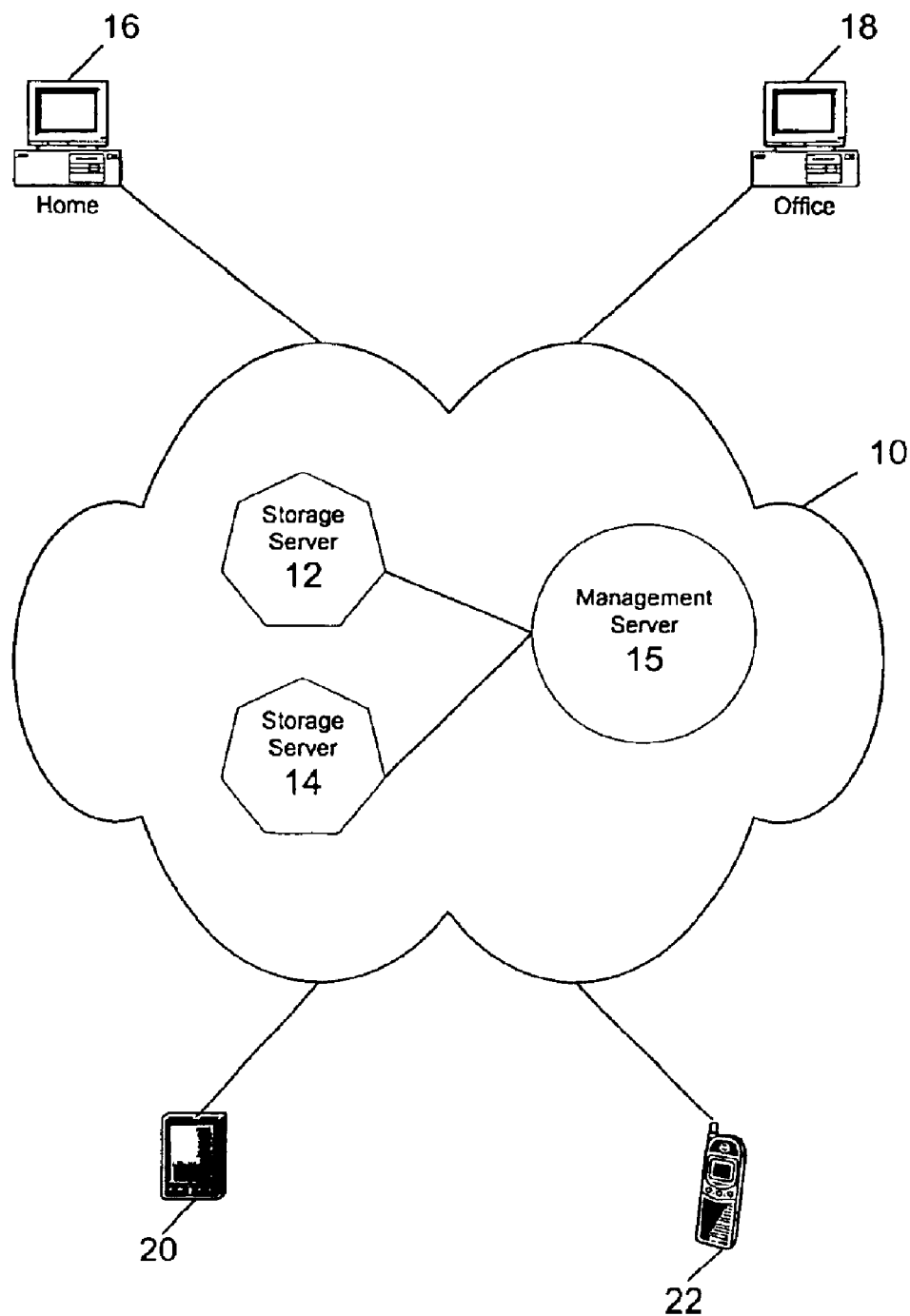
FIG. 1 is a exemplar block diagram of a data transfer and synchronization system having a change log aggregation and optimization mechanism in accordance with the present invention.

FIG. 1 is a generalized block diagram of an exemplary data transfer and synchronization system. In particular, the system includes network 10 that includes one or more storage servers 12, 14 and a management server 15. A plurality of client devices (e.g., home PC 16, office PC 18, personal information Palm® computing device 20, and web-enabled cellular telephone 22) are capable of coupling to network 10 and exchanging synchronization information in an off-line fashion via the storage servers 12 and 14, in accordance with the techniques described in U.S. Pat. No. 6,694,336, issued on Feb. 17, 2004, U.S. patent application Ser. No. 09/491,675 filed Jan. 26, 2000, and U.S. Pat. No. 6,671,757, issued on Dec. 30, 2003, all entitled "Data Transfer and Synchronization System," incorporated herein by reference.

Client software of the present invention is installed on both home PC 16 and office PC 18 of FIG. 1, for example, and is configured to operate in conjunction with an operating system such as Microsoft Windows®. The client software, when executed, interacts with the various applications on the user's PCs. The user interacts with the client software and configures the software such that the applications are prioritized. Data is then extracted from the various applications, organized in a format independent of the particular application and device from which the data originated, and incorporated into a data package. With exemplary embodiments of the present invention, various classes of data, including contacts (e.g., names, addresses, phone numbers, email addresses), Internet browser bookmarks (e.g., Netscape Navigator®, Microsoft Explorer®), calendar events, email messages (e.g., Inbox, Sent Items, Deleted Items), notes, tasks, and files (e.g., word processor specific documents, electronic presentations, spreadsheets, binary format of executable files) can be manipulated and synchronized between the plurality of devices.

Consider, for example, a scenario where a user has installed the Microsoft Outlook® application on home PC 16 and the user has entered the information of five individuals into the Contacts folder. When instructed by the user to synchronize the contents of the Contacts folder, the client software accesses Outlooks and assembles the information for five individuals in a DataPack CONT.D000. In this case, the UUID "CONT" identifies Contacts information as the specific object and suffix D000 signifies that this DataPack is version "0." The contacts are combined in DataPack CONT.D000 as a collection of five transactions, each of which is assigned a unique ID number 1, 2, . . . 5. $ID_1$ may represent contact information for Jane Smith and $ID_2$ may represent contact information for John Doe. In this example, each transaction 1, 2, ... 5 is associated with an associated action, "Add." DataPack CONT.D000 is subsequently uploaded to network 10 and stored on, for example, storage server 12.

Later, office PC 18 connects to network 10 and office PC 18 sends a signal to management server 15 informing management server 15 that office PC 18 has not downloaded any DataPacks. Management server 15 responds by sending a signal to office PC 18 indicating that a DataPack CONT.D000 of change information for contacts has been stored on storage server 12 since office PC 18 last connected to network 10. Office PC 18, in response, sends a signal to management server 15 requesting DataPack CONT.D000. The most recent data package(s) stored on storage server 12 are identified (in this example, version 0 of the contact data, CONT.D000) and DataPack CONT.D000 is then downloaded to office PC 18.

The change information in that data package, "Adds" of contacts in this case, is then applied to the pertinent application in office PC 18. In this example, the client software on the office PC is configured to synchronize contacts using a Lotus Notes® application. Thus, the five Adds from CONT.D000 are applied to the contacts in Lotus Notes®, so that the contact information in home PC 16 and office PC 18 is synchronized. The office PC 18 then sends a signal back to management server 15 indicating that office PC 18 has applied version "0" of the contacts data package(s). This information is preferably maintained in a registry by management server 15 for each and every device that couples to the network to download and upload change information.

Subsequently, the user of office PC 16 updates the contacts in Lotus Notes® and adds one or more contacts. In this example, ten new contacts are added. Thus, the Lotus Notes® application uploads a second data package to network 10, the data package including the ten contacts and each having the associated action, "Add." This data package represents more recent change information than the information in CONT.D000. The data package uploaded by office PC 18 is identified by a unique filename, in this example, CONT.D001. In addition, office PC 18 sends a signal to management server 15 confirming that CONT.D001 has been uploaded to network 10. The registry is updated to indicate that office PC 18 has already applied the change information in CONT.D001.

Home PC 16 subsequently connects to data network 10, and the client software on home PC 16 communicates with management server 15 coupled to network 10. In particular, home PC 16 sends a signal to management server 15 identifying CONT.D000 as the most recent version of change information the last time home PC 16 was coupled to data network 10. Management server 15 queries the storage servers for any more recent data packages of changes to contact information. Management server 15 identifies such data package(s), CONT.D001 in this example, and sends a signal to home PC 16 informing home PC 16 that such data package(s) exist. The client software on home PC 16 then requests the new data package(s), and management server 15 then downloads the data package(s) to home PC 15. The change information therein, in this case the ten contacts from CONT.D001 to be added, is then applied to the Contact information maintained by Microsoft Outlook® on home PC 16. The communication of the change information to Microsoft Outlook® and subsequent updates to the contacts in Outlook® are coordinated by the client software on home PC 16. Thus, the Contact information in home PC 16 and work PC 18 is again synchronized.

Other transactions, in addition to "Add," are provided with exemplary embodiments of the present invention. One of these is the transaction, "Modify." Using the present example, the contact information for a person may sometimes change after CONT.D001 is uploaded to network 10. For instance, Jane Smith may call the user on the telephone and tells the user that Jane has changed her phone number. The user then accesses office PC 18 and changes the phone number for Jane Smith in the user's Contacts folder.

The user then activates, for example, a "Synchronize" button displayed on the computer screen by the client software, so a new data package or the change log, CONT.D002, is created and uploaded to network 10 and stored on one of storage servers 12, 14. A signal is sent by office PC 18 to management server 15 informing management server 15 that data package CONT.D002 has been uploaded. Data package CONT.D002 differs from data packages CONT.D000 and CONT.D001, in that the action, "Modify" is used instead of "Add." The Modify instruction and the associated change information is correlated with the particular user. In particular, the Modify instruction is associated with the pertinent ID, in this case $ID_1$ representing Jane Smith. In addition, data package CONT.D002 includes the field to be modified, in this example, "Phone," and the new information, in this example, Jane Smith's new phone number.

Subsequently, when home PC 16 connects to network 10, the data package CONT.D002 is downloaded to home PC 16, and the client software recognizes that, for $ID_1$, the information within the field "Phone" has been updated. The modification is then made to this contact information via Microsoft Outlook®. Home PC 16 then sends a confirmation signal to management server 15, confirming that home PC 16 has received and applied the change information in version #2 of the contacts data packages. The pertinent information in the registry for home PC 16 is then updated. The next time home PC 16 couples to network 10, home PC 16 sends a signal to management server indicating that home PC 16 has received CONT.D002. If no subsequent data packages with change information for contacts have been stored on the storage servers, then no data packages are downloaded to home PC 16.

As changes are made for various classes of data, data packages accumulate on storage servers 12, 14 and consume valuable storage space. As the number of stored data packages increases, the amount of available storage space on storage servers 12, 14 correspondingly decreases. In the example above, assume for illustrative purposes that data package CONT.D000 occupies 2 kilobytes ("K") of memory on storage server 12, CONT.D001 occupies 1 K, and CONT.D002 occupies 0.5 K, for a total of 3.5 K memory. In situations a user is limited, for example, to 25 megabytes ("M") of memory, the amount of available storage space continues to decrease as data packages are updated and change logs are accumulated, until storage space on the storage servers 12, 14 are exhausted.

Thus, prior to the present invention, each synchronization created a unique change log to record any changes in the data to be synchronized. The change log is subsequently uploaded to network 10 via, for example, an Internet connection and stored in storage server 12. Over time, as the user performs additional synchronizations, the change logs accumulate and when a new client device, or a client device that has not been recently synchronized, is connected to network 10 and synchronized, all or some substantial subset of the accumulated change logs are downloaded and applied one at a time. Thus, if there are three change logs (e.g., a first change log may record a change in a contact's home phone number, a second change log may record an addition of a work phone number for the contact, and a third change log may yet record the deletion of the contact entirely), all three change logs must be downloaded and applied to the client device one at a time when a new client device is subsequently synchronized, even though the contact is ultimately deleted.

In situations where there is a sequence of change logs, there may be numerous conflicting changes to the same item. When this happens the user is asked to decide which of the conflicting versions to keep. Prior to change log aggregation (i.e., with multiple change logs), each time an item, for which a conflict existed, was changed, the user was required to resolve ostensibly the same conflict. In an aggregated log, there would generally be only one entry for each item and thus, only one possible conflict to resolve.

Also, in situations where a large number of change logs have been generated, there is considerable potential inefficiency inherent in the old sequence of downloading and applying each change log in turn. In a given item entry there may only be one or two fields and there may be other fields belonging to the same item scattered throughout entries in the sequence of change logs. Moreover, some of these later entries overwrite earlier ones. As a result, a separate transaction is required for each occurrence of an item record in the change log sequence and it is possible for the same field in a record to be updated many times during a single sync. With an aggregated change log redundant changes are eliminated and records can be updated more efficiently via a single transaction. To further maximize the efficiency of the present invention, a means is provided for compacting or compressing the aggregated change log if a compact threshold is ever exceeded.

For items consisting of large quantities of data such as files (e.g., Microsoft Word® document), changes are transmitted as "binary deltas." These are optimized packages, which encode the information required to convert a binary image from one "version" to the next. As changes accumulate the size of the individual deltas, taken together, eventually exceeds the size of the object itself. At this point a new base version, or version "0," may be established and the complete object sent. However, the change logs contain an identifier not the actual delta, or data. This identifier is used to request the delta itself, when the change log is applied. Thus, in aggregating change logs for files, if a new base version is encountered existing changes can be flushed and only the new base and any subsequent changes need be downloaded. Also, if a user has a conflict and resolves it by choosing a local version of the file, a new version "0" must be established, as there is no way of knowing the relationship between the local version and those in the stored change logs.

The change log aggregation and optimization mechanism of the present invention is implemented in the client device. Specifically, the change log aggregation and optimization mechanism of the present invention is inserted into the download-and-apply sequence where change logs are fetched and interpreted to update application data. Instead of applying each change log as it is downloaded, it is merged into the "rolled" or aggregate log. The change log aggregation and optimization mechanism of the present invention is further illustrated in the flow diagrams of FIGS. 1A and 2.

Figure 1A:
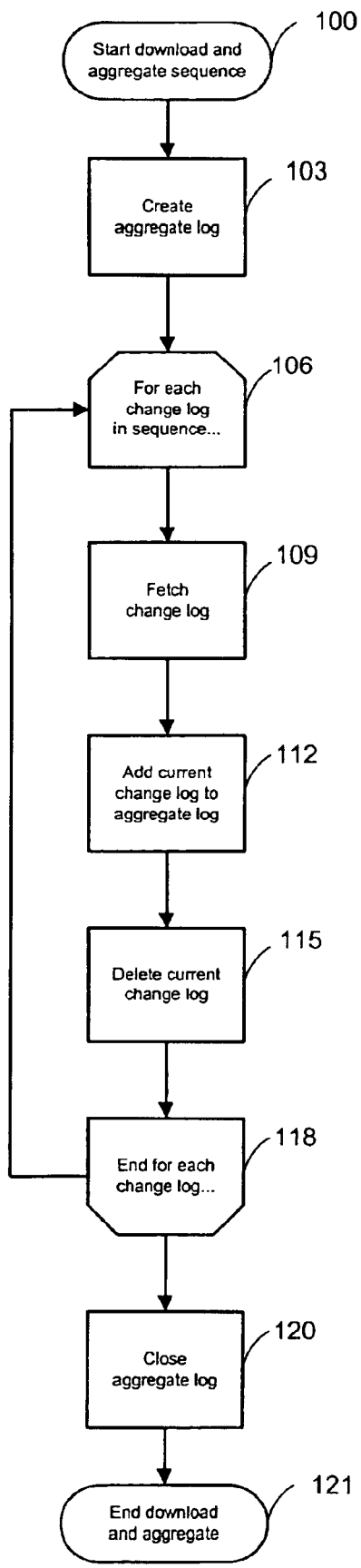
FIG. 1A is a flow diagram illustrating a start download and aggregate sequence of the present invention.

FIG. 1A illustrates the addition of a current change log to an aggregate change log. The download and aggregate sequence begins in Step 100 of FIG. 1A. A rolled log, or aggregate log, is created in Step 103. For each change log in the sequence, starting with Step 106 the following steps are performed. In Step 109 the current change log is retrieved or downloaded. The current change log is then added to the aggregate log in Step 112. The current change log is then deleted in Step 115 and Step 118 repeats Steps 109, 112, and 115 until there are no additional change logs in the sequence. Once this happens, the aggregate log is closed in step 120 and the download and aggregate sequence is terminated in Step 121. The Start Download and Aggregate sequence of the present invention can be summarized in the following steps:

1. Create aggregate log;
2. Fetch (download) change log;
3. Add change log to aggregate;
4. Delete change log;
5. Repeat the fetch add delete sequence for each change log to be aggregated; and
6. Close aggregate log.

Figure 2:
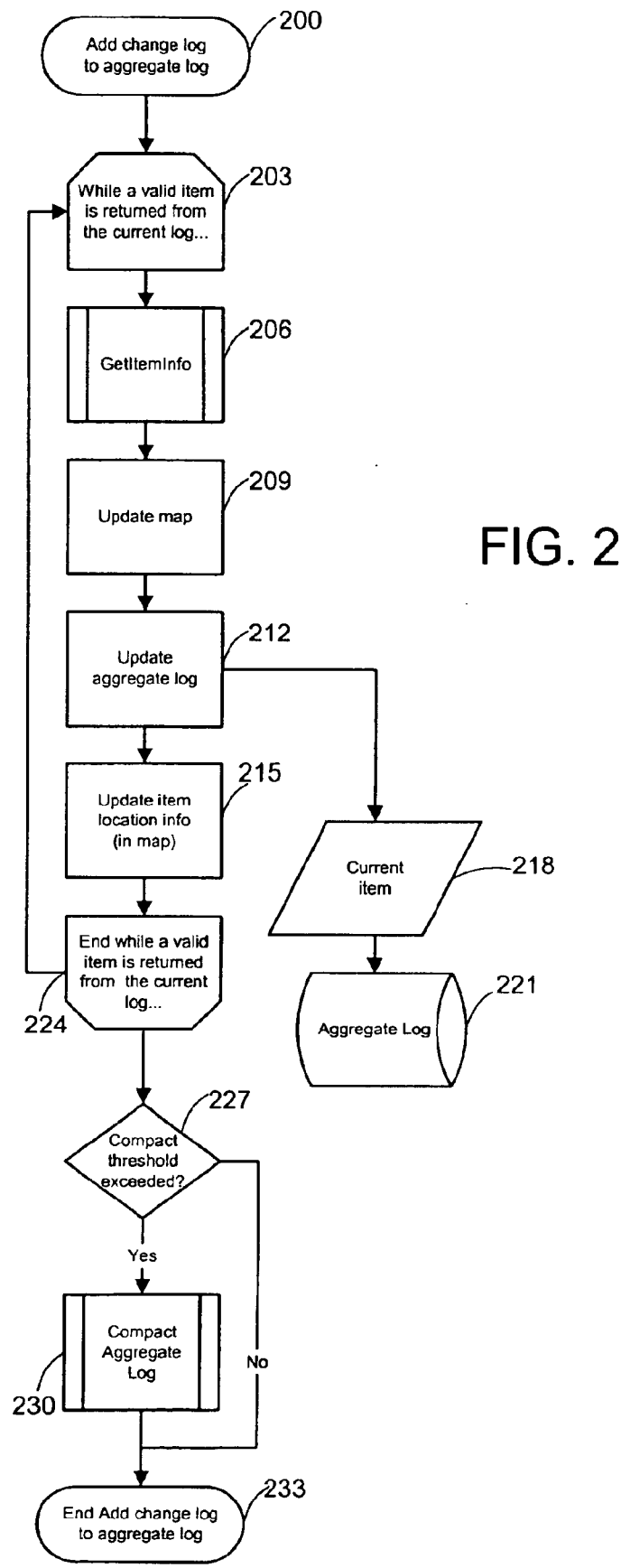
FIG. 2 is a flow diagram illustrating the sequence of steps for adding a change log to an aggregate change log in accordance with the present invention.

FIG. 2 shows an expanded view of Step 112 of FIG. 1A. For each item in the current change log the following steps are performed. The item in the current change log is first retrieved in Step 206 and the map is updated in Step 209. The map stores meta-data to facilitate the aggregation or merging operation. It allows a one-to-many relationship between the keys and the items with which they are associated. This is a requirement for item types whose changes are realized as "deltas," as each change must be applied separately and in order. Thereafter, in Step 212 the aggregate log is updated and in Step 215 the item location information is also updated. Simultaneously in Steps 218 and 221 the current item retrieved from the current change log is written to and stored in the aggregate log. In retrieving and merging subsequent change logs into the aggregate log, it is important to note that this process combines the data from two records for the same item using the meta-data in the map to locate each field and find its data inside the correct change log. Once the item with its merged data has been written to the end of the aggregate log, the previous entry is marked obsolete, and can thus be deleted at a later time.

Once there are no additional items in the current change log, in Step 227, the present invention determines whether the compact threshold has been exceeded. If the compact threshold has been exceeded then, in Step 230, a compact aggregate log step 230 is initiated to compress or compact the size of the aggregate log. Compact aggregate log step 230 essentially removes obsolete records in the aggregate log to minimize the size of the aggregate log and thus conserve memory in storage servers 12, 14. This is accomplished by iterating over each record in the aggregate log, reading only the valid records (having skipped over any obsolete items), and writing the item back into the aggregate log without skipping obsolete items, effectively sliding data in the aggregate log back over obsolete records and thus eliminating them.

Otherwise if the compact threshold in Step 227 has not been exceeded then the sequence of steps initiated by Step 112 terminates in Step 233. The series of steps beginning with Step 112 effectively reads each record from the current change log and places this information in the aggregate log. The Add Change Log to Aggregate Log sequence of FIG. 2 can be summarized in the following steps:

1. Get item information;
2. Update the map;
3. Update the aggregate log;
4. Update item location information (in the map);

5. Repeat the above sequence while we get a valid item; and
6. Compact the aggregate log if the compact threshold has been reached.

Figure 3:
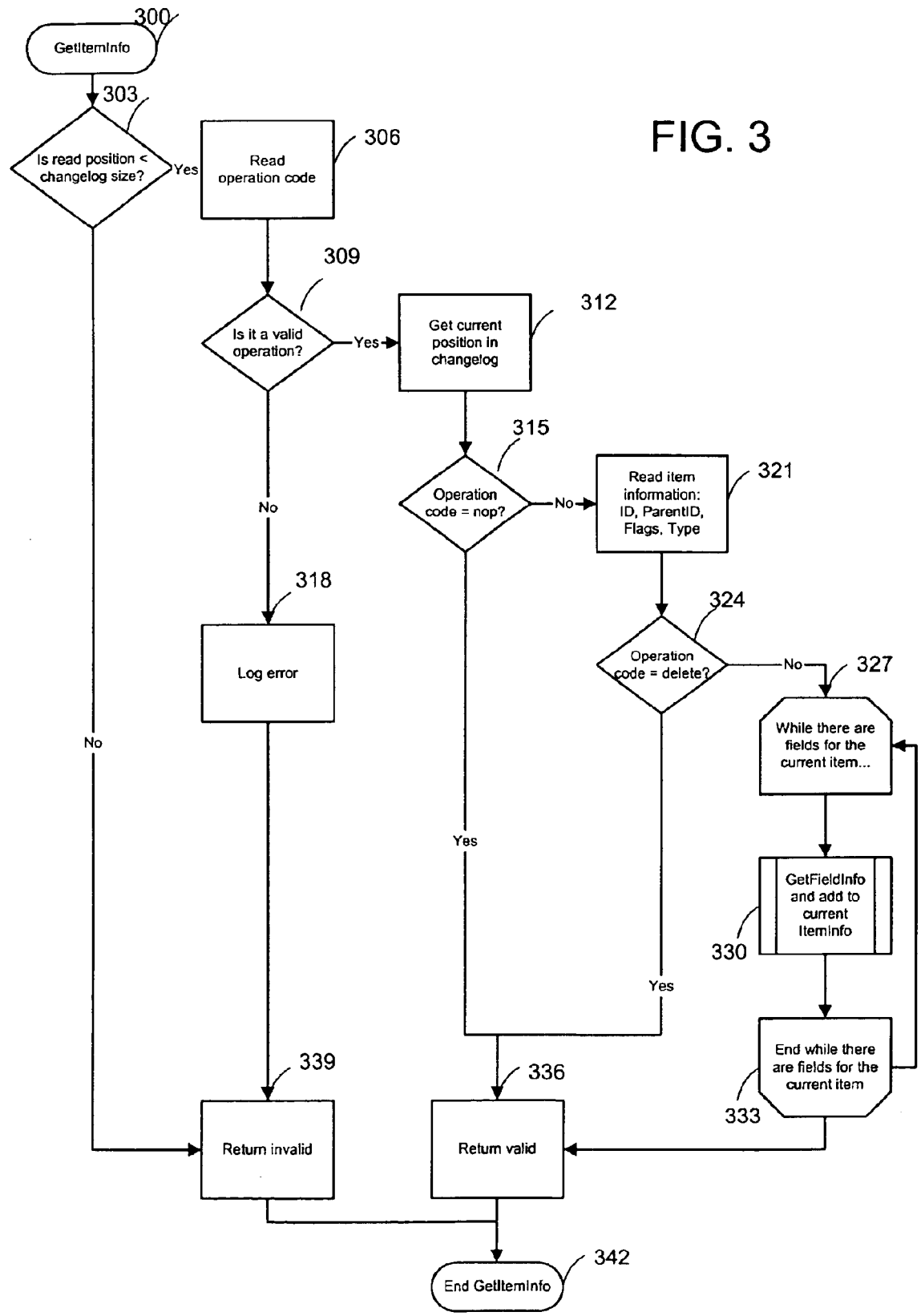
FIG. 3 is a flow diagram illustrating the steps for retrieving items of a change log in accordance with the present invention.

FIG. 3 shows an expanded view of Step 206 of FIG. 2. In Step 303, the present invention first determines whether the current position is less than the size of the change log. If the current position of the record is not less than the size of the change log then an invalid message is returned in Step 339 and the process terminates in Step 342. However if the current position is less than the size of the change log then an operation code is read in Step 306. The present invention then determines, in Step 309, whether the operation code is associated with a valid operation. If it is not a valid operation then a log error is generated in Step 318, an invalid message is returned in Step 339 and the process terminates with Step 342. If, however, the operation code is associated with a valid operation the current position of the record is retrieved from the change log in Step 312. In Step 315, the invention determines whether the operation code corresponds to a "NOP," or a non-operation, in Step 315. The NOP essentially models a skip behavior. If the operation code corresponds to an NOP, a valid message is returned in Step 336 and the process terminates in Step 342. However, if the operation code is not an NOP, information associated with the item is read from the change log "ID, Parent ID, flags, type" in Step 321.

In Step 324, the invention determines whether the operation code corresponds to a delete function. If the operation code corresponds to a delete function then a valid message is returned in Step 336 and the process terminates in Step 342. However if the operation code does not correspond to a delete function, then while there is another field for the current item the field information for the item is obtained an added to the item in Step 330. The for-loop that begins in Step 327 ends in Step 333 when there are no additional fields for the current item. Thereafter, a valid message is returned in Step 336 and the process terminates in Step 342. The following steps summarize the "GetItemInfo" sequence of FIG. 3:

1. If read position past end return invalid;
2. Read operation code;
3. If it is invalid return valid;
4. Get current position;
5. If operation is a "NOP" (no operation) return valid;
6. Read item information;
7. If operation is a delete return valid;
8. Get field information and add to current item;
9. Repeat get field and add for each field in the current item record; and
10. Return valid.

Figure 4:
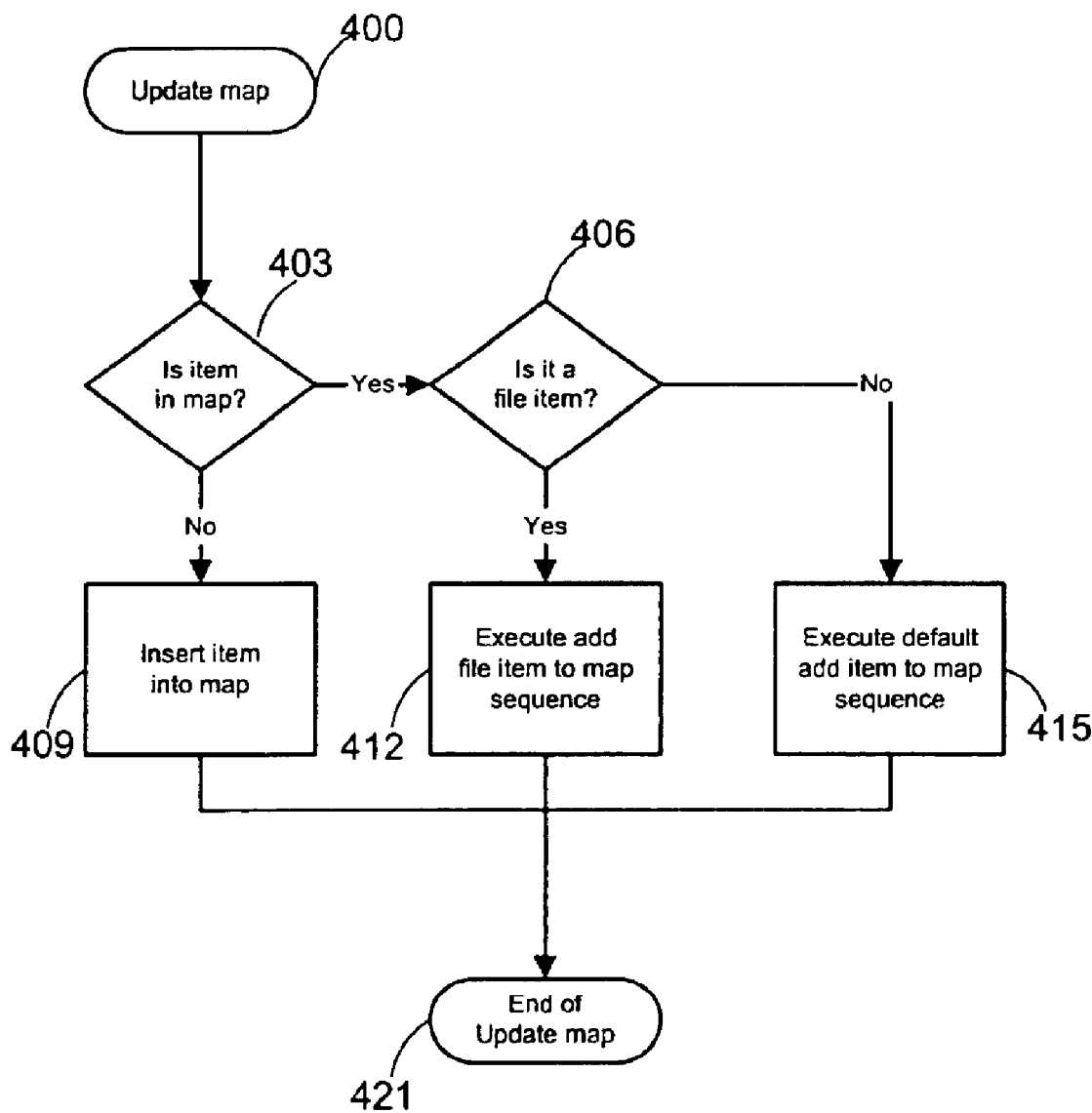
FIG. 4 is a flow diagram illustrating the steps for updating a map of a change log in accordance with the present invention.

FIG. 4 shows an expanded view of Step 209 of FIG. 2. At this point all the fields in a given item have been retrieved from the change log. In Step 403 the invention determines whether the item is in the map. If the item is not in the map then, in Step 409, the item is inserted into the map, the item and field location information is updated in Step 418 and the process terminates in Step 421. However, if the item is in the map then, in Step 406, the invention determines whether the item retrieved is a file. If the retrieved item is a file then, in Step 412, a sequence of steps to execute and "add file item to map" is performed in Step 412. Thereafter the item in the field location information is updated and the process terminates in Step 421. However, if the retrieved item is not a file then the sequence of steps to "default add item to map" is performed in Step 415. Again, the item and field location information is updated and the process terminates in Step 421.

Figure 5:
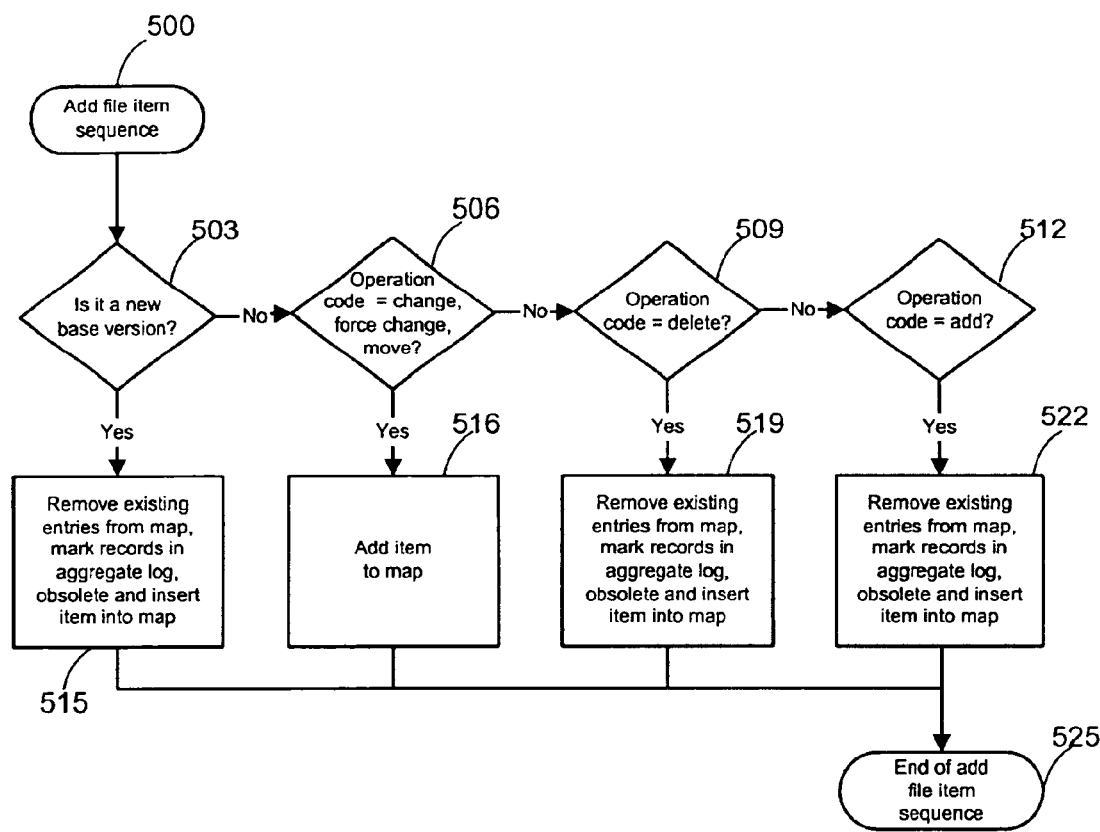
FIG. 5 is a flow diagram illustrating the sequence of steps for adding a file item in accordance with the present invention.

FIG. 5 shows an expanded view of Step 412 of FIG. 4. In Step 503 the invention determines whether the file has a new base version. If the file has a new base version then, in Step 515, the existing entries are removed from the map, the records in the aggregate log are marked obsolete, the file is inserted into the map and the process ends in Step 525. However, if the file does not have a new base version then the invention determines whether the file is a change, a force change, or a move in Step 506. If the file is either a change, a force change, or a move then, in Step 516 the file is added to the map. File item changes must be applied serially and cannot be aggregated. This requires the use of a map that allows a "one to many" relationship between keys and items to maintain a "stack" of item records for a single item. The process then ends in Step 525.

However, if the file item is not a change, a force change, or a move, then the invention determines whether the file item is a delete in Step 509. If it is a delete, then in Step 519 the existing entries are removed from the map, the records in the aggregate log are marked obsolete, the delete is inserted into the map, and the process ends in Step 525. If the file item does not have a new base version, is not a change a force change or a move and is not a delete, then by default in Step 512 it is an add. In Step 522, the existing entries are removed from the map the records in the aggregate log are marked obsolete and the add is inserted into the map. Once this has been done, the process ends in Step 525.

Figure 6:
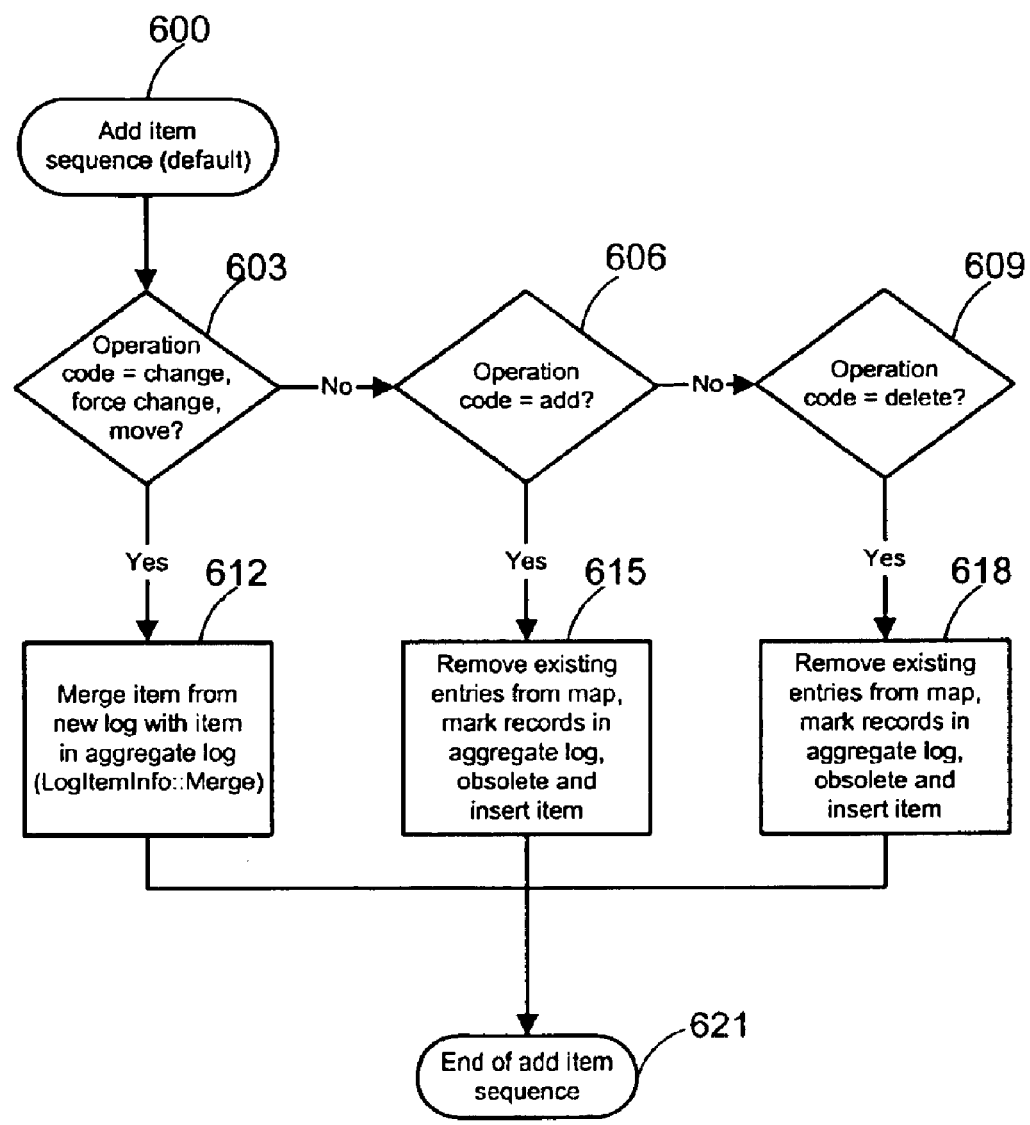
FIG. 6 is a flow diagram illustrating the default sequence of steps for adding an item in accordance with the present invention.

FIG. 6 shows an expanded view of Step 415 of FIG. 4. In Step 603 the invention determines whether the item (in this case, the item is not a file) is a change, a force change, or a move. If the item is a change, a force change, or a move, then, in Step 612, the item from the new log is merged with the item in the aggregate role. However, if the item is not a change, a force change, or a move, then, in Step 606, the invention determines whether the item is an "add." If the item is an add, then in Step 615, the existing entries are removed from the map, the records in the aggregate role are marked as obsolete, and this add is inserted into the map. However, if the item is not an "add" then in Step 609, by default the item is then a delete. Subsequently, in Step 618, the existing entries from the map are removed, the records in the aggregate log are marked as obsolete, and the delete is inserted into the map. After Steps 612, 615 and 618 the process ends with Step 621.

Figure 7:
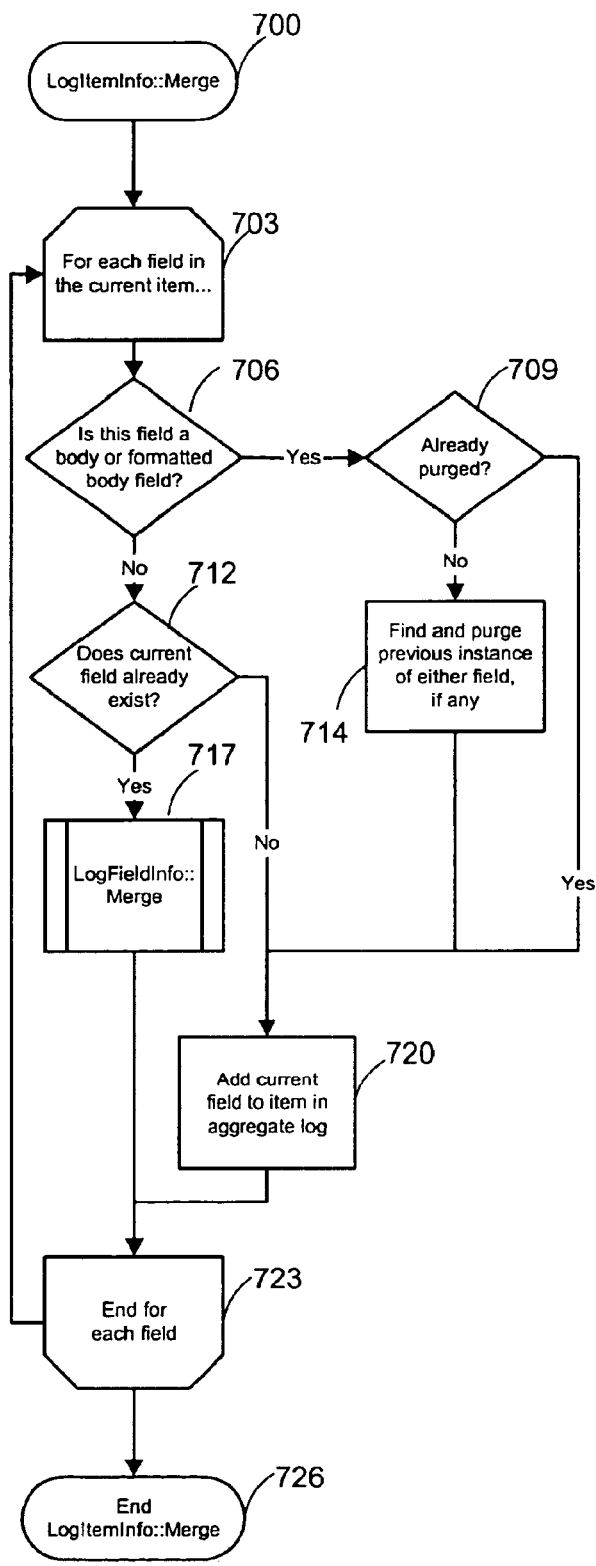
FIG. 7 is a flow diagram illustrating the steps for merging fields of an item in accordance with the present invention.

FIG. 7 shows an expanded view of Step 612 of FIG. 6. Beginning with Step 703, for each field in the current item the following steps are performed. In Step 706, the present invention determines whether the current field is a body or a formatted body field. If the current field is not a body or a formatted body field then the invention determines, in Step 712, whether a current field already exists. If the current field already exists then the fields are merged in outside process 717. However, if the current field does not already exist then, in Step 720, the current field is added to the item in the aggregate log. Turning back to Step 706, if the field is a body or a formatted body field then the invention next determines whether the field has already been purged in Step 709. If it has not been purged then, in Step 714 the previous instance of either field, if any, are found and purged and the current field is subsequently added to the item in the aggregate log in Step 720. However, if the field has been purged then Step 709 proceeds directly to Step 720 where the current field is added to the item in the aggregate log. The for-loop beginning with Step 703 ends with Step 723 when the process has cycled through each field in the current item. The process then terminates in Step 726.

Figure 8:
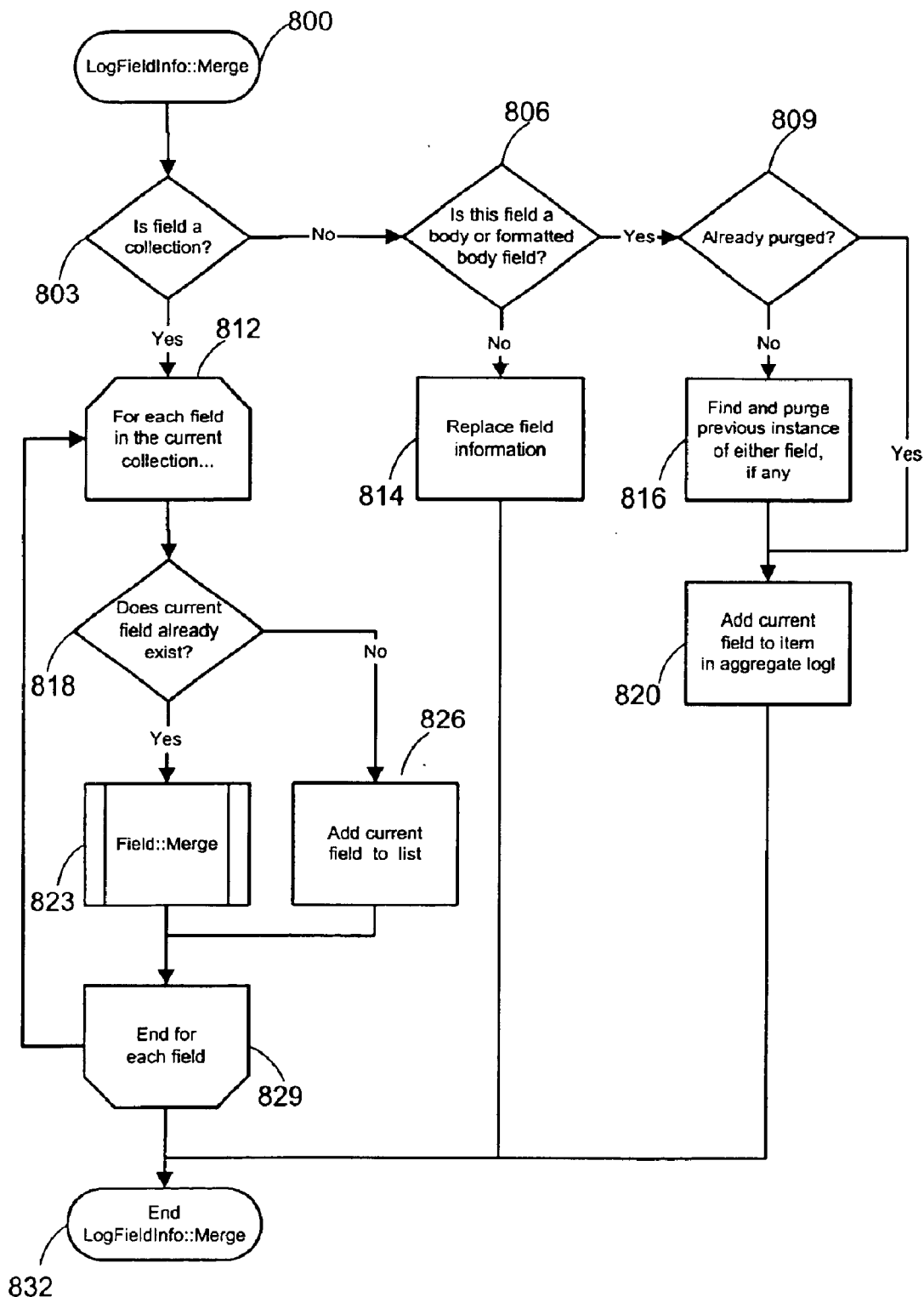
FIG. 8 is a flow diagram illustrating the steps for merging fields of an collection in accordance with the present invention.

FIG. 8 shows an expanded view of outside process 717 of FIG. 7. In Step 803, the invention first determines whether a given field is a collection. If the field is a collection then, in Step 812, for each field in the current collection the following steps are performed. In Step 818, the invention determines whether the current field already exists. If the current field already exists then outside process 823 is performed and the field in the current collection is merged into the aggregate log. If the current field does not already exist then, in Step 826 the current field is added to the list. Step 829 then repeats Steps 818, 823 and 826 until there are no additional fields in the current collection. Going back to Step 803, if the field is not a collection then the invention determines whether the field is a body or a formatted body field in Step 806. If the field is not a body or a formatted body field then, in Step 814, the field information is replaced. However, if the field is a body or a formatted body field then, in Step 809, the invention determines whether the field has already been purged. If the field has not already been purged then, in Step 816, the previous instance of either field, if any, is found and purged. If the field has been purged then, in Step 820 the current field is added to the item in the aggregate log. After Steps 829, 814, and Step 820, the process ends in Step 832.

Figure 9:
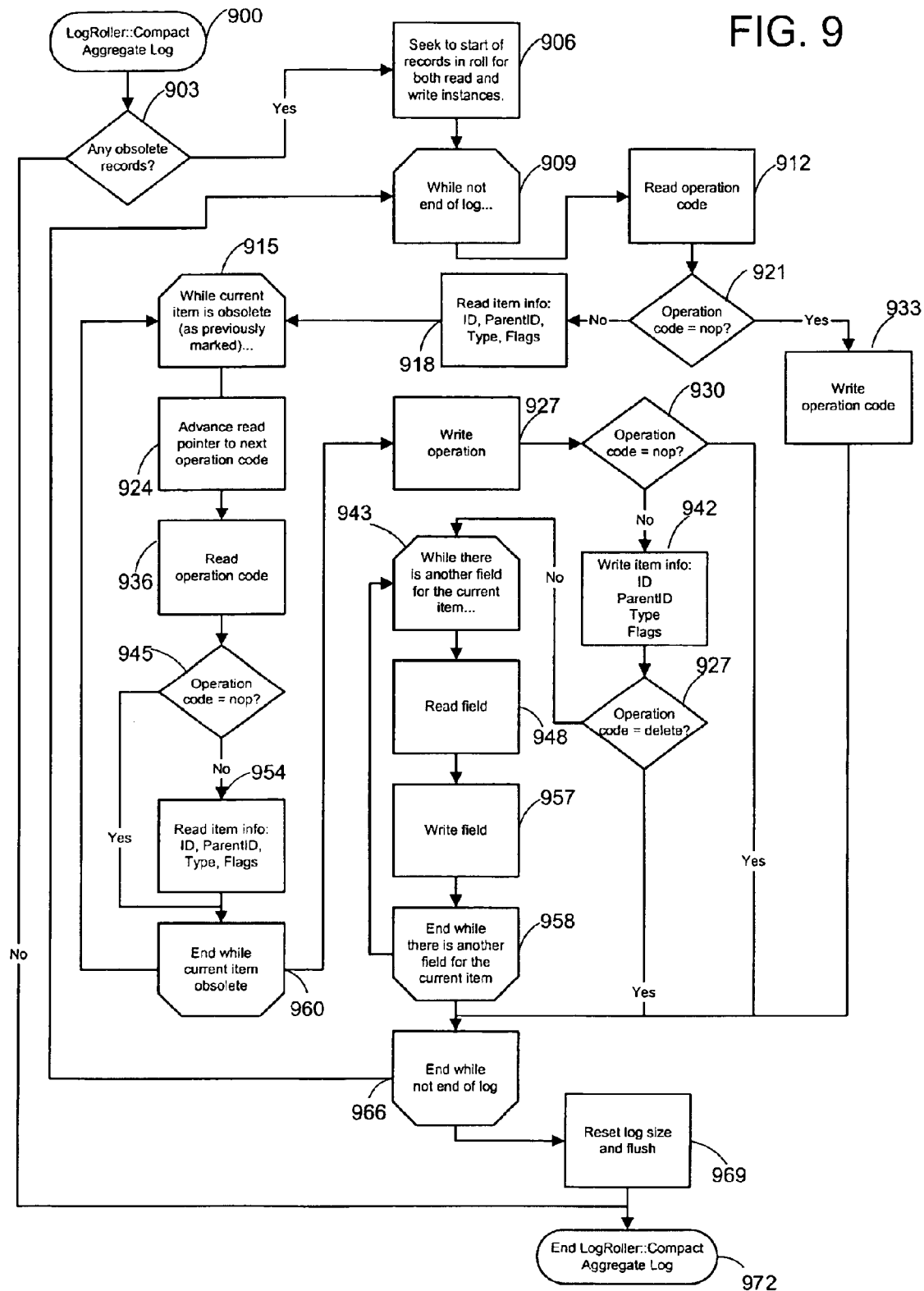
FIG. 9 is a flow diagram illustrating the steps for compacting an aggregate log in accordance with the present invention.

FIG. 9 shows an expanded view of outside process 230 of FIG. 2. Starting with Step 903, the invention first determines whether there are any obsolete records. If not, the process ends in Step 972. However, if obsolete records exist then, in Step 906, a seek to the start of records in the aggregate log for both read and write instances is performed. The for-loop initiated by Step 909 begins in Step 912 with the operation code for the read instance being read in. In step 921, the invention determines whether the operation code read in Step 912 is a no-op. If the operation is a no-op, the operation code is written in step 933. If after Step 933, the end of the aggregate log has been reached in Step 966, then the aggregate log size is reset and the aggregate log is flushed in Step 969 and thereafter the process ends in Step 972.

However, if the operation in Step 921 is not a no-op then, in Step 918, item information comprising ID, Parent ID, type, and flags is read. In Step 915, so long as the current item is obsolete, the following steps are performed. In Step 924 the read pointer is advanced to the next operation code. In Step 936 the operation code is read and in Step 945 the invention determines whether the operation is a no-op. If the operation is not a no-op then, in Step 954, item information comprising ID, Parent ID, type, and flags is read. However, if Step 945 results in a no-op, then, in Step 960, the process loops back to Step 915 while the current item is obsolete. At the same time, a write operation is performed in Step 927 and in Step 930, the invention determines whether this operation code is associated with a no-op.

If the operation code of Step 927 is associated with a no-op, then the process proceeds to Step 966 which then loops back to Step 909 unless the end of the aggregate log has been reached. However, if the operation code of Step 927 is not associated with a no-op then in Step 942, item info (ID, Parent ID, type and flags) are written. If the operation code of Step 927 corresponds to a delete then the process proceeds to Step 966, which then loops back to Step 909 unless the end of the aggregate log has been reached. If the operation code of Step 927 is not a delete then while there is another field for the current item the following steps, beginning with Step 943, are performed. In Step 948, the field is read and in Step 957 the field is written. Once there are no additional fields for the current item the process proceeds to Step 966 and proceeds to Steps 969 and 972 if the end of the aggregate log has been reached.

Figure 10:
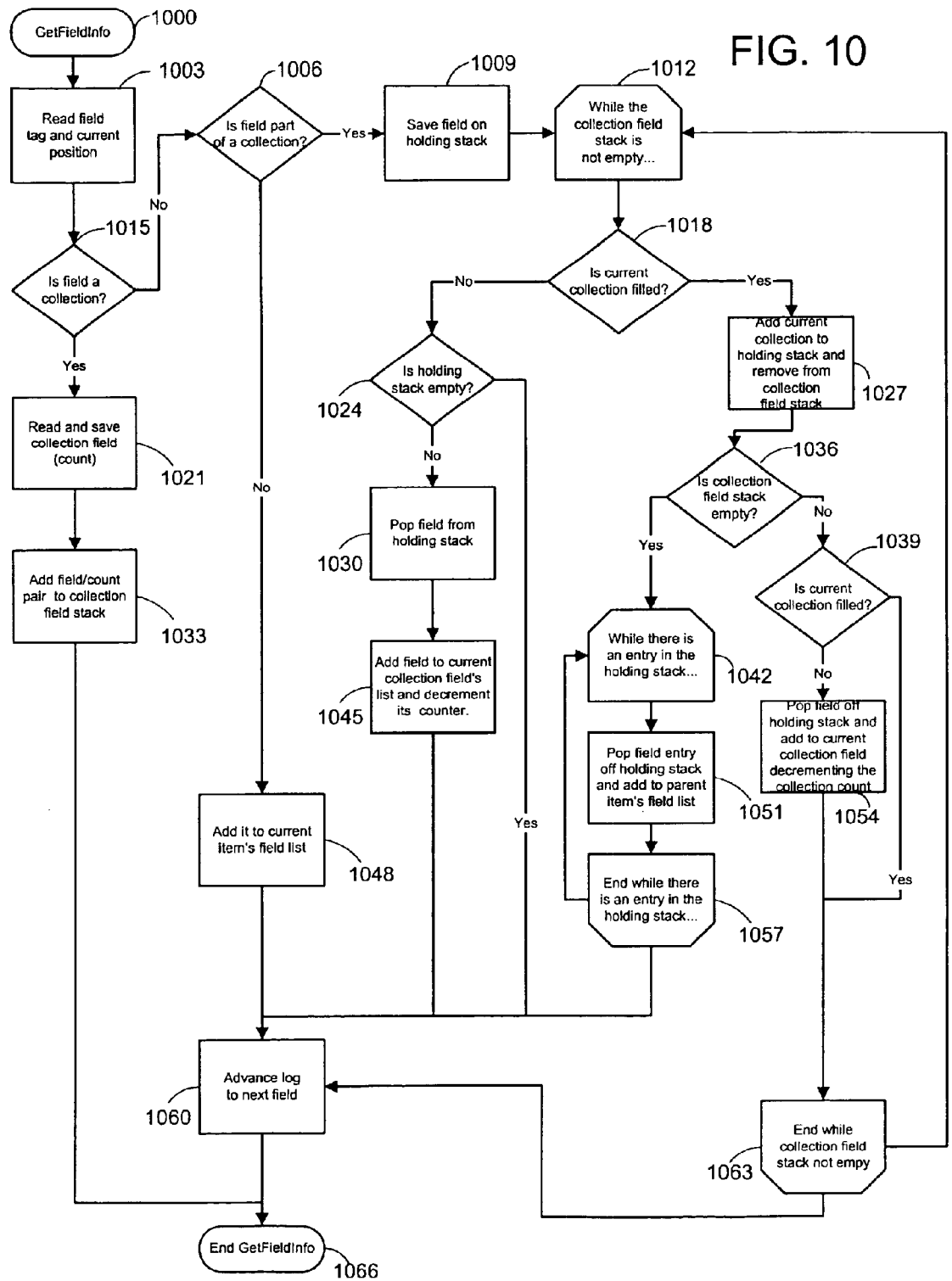
FIG. 10 is a flow diagram illustrating the steps for retrieving fields from a current item of a change log in accordance with the present invention.

FIG. 10 shows a flow chart illustrating the process for getting field information. The field tag and the current position are initially read in Step 1003. In Step 1015 the invention determines whether the field is a collection. If the field is a collection then, in Step 1021, the collection field (count) is read and saved. Then, in Step 1033, the field/count pair is added to the collection field stack. The process then terminates in Step 1066. However, turning back to Step 1015, if the field is not a collection then, in Step 1006 the invention determines whether the field is a part of a collection. If the field is not part of a collection then, in Step 1048 the field is added to the current item's field list. The change log is then advanced to the next field in Step 1060 and the process terminates at Step 1066. Turning back to Step 1006, if the field is part of a collection then, in Step 1009, the field is saved on a holding stack. Thereafter in Step 1012, the following steps are performed until the collection field stack is empty. In Step 1018 the invention determines whether the current collection is full. If the current collection is not full then, in Step 1024, the invention determines whether the holding stack is empty. If the holding stack is empty the aggregate log is advanced to the next field as provided in Step 1060 and the process ends with Step 1066. However, if the holding stack is not empty then, in Step 1030, the field is popped from the holding stack. The field is then added to the current collection field's list and its counter is decremented in Step 1045.

Turning back to Step 1018, if the current collection is full then, in Step 1027, the current collection is added to the holding stack and removed from the collection field stack. Then in Step 1036, the invention determines whether the collection field stack is empty. If the collection field stack is empty then, in Step 1051, the field entry is popped off the holding stack and added to the parent item's field list until there are no more entries in the holding stack, so long there is an entry in the holding stack (i.e., if the condition established by the for-loop defined by Steps 1042 and 1057 is still valid). Turning back to Step 1036, if the collection field stack is not empty then, in Step 1039, the invention determines whether the current collection is full. If the current collection is not full then, in Step 1054, the field is popped off the holding stack, added to the current collection field, and the collection count is decremented. If the current collection is full, then Step 1039 proceeds directly to Step 1063 and Step 1063 will loop back to Step 1012 unless the collection field stack is empty.

The foregoing description of preferred embodiments of the present invention has been provided for the purposes of illustration and description. It is not intended to be exhaustive or to limit the invention to the precise forms disclosed. Many modifications and variations will be apparent to practitioners skilled in this art. The described embodiments were chosen and described in order to best explain the principles of the invention and its practical application to thereby enable others skilled in the art to understand the invention for various embodiments and with various modifications as are suited to the particular use contemplated. It is intended that the scope of the invention be defined by the following claims and their equivalents.

What is claimed is:

1. A method for updating application data in a client device of a data transfer and synchronization system, said method comprising the steps of:

downloading a first change log of a plurality of change logs from a server system, each of said plurality of change logs reflecting changes to said application data;

adding said first change log to an aggregate change log, the aggregate change log comprising a summary of changes in said added change log and any previous change logs;

deleting said first change log;

repeating said downloading, adding, and deleting steps for a next change log of said plurality of change logs until no additional change logs exist; and applying said aggregate change log to said application data to update said application data.

2. The method of claim 1, wherein said adding step further comprises the steps of:

(a) retrieving information for a valid item in said application data;

(b) updating a map of said aggregate log, said map storing meta-data;

(c) writing said item to said aggregate log;

(d) updating a location of said valid item in said map; and (e) repeating steps (a)–(d) for all remaining valid items of a current change log.

3. The method of claim 2, further comprising the step of:

compacting said aggregate log if a compact threshold is exceeded.

4. The method of claim 1, wherein said application data comprises data classes for contacts, internet browser bookmarks, calendar events, email messages, notes, tasks, and files.

5. The method of claim 4, wherein said contacts comprise records identifying names, addresses, phone numbers, and email addresses for a plurality of individuals.

6. The method of claim 4, wherein said files comprise word processor specific documents, electronic presentations, spreadsheets, and executable files in binary format.

7. The method of claim 1, wherein said application data is in a universal data format.

8. An apparatus for updating application data in a client device of a data transfer and synchronization system, said apparatus comprising:

a downloading routine for iteratively retrieving a plurality of change logs from a server system, each of said plurality of change logs reflecting changes to said application data;

a merging routine for iteratively aggregating the contents of said plurality of change logs to an aggregate log;

a change log deletion routine for iteratively deleting said plurality of change logs; and an updating routine for applying the contents of said aggregate log to said application data to update said application data.

9. The apparatus of claim 8, wherein said merging routine further comprises:

an item retrieval routine for retrieving a plurality of items from said application data;

a map update routine for updating a map of said aggregate log wherein said map stores meta-data;

a field retrieval routine for retrieving field information from said plurality of items from said application data; and an item location update routing for updating the location of a plurality of items in said map.

10. The apparatus of claim 9, wherein said merging routine further comprises:

an aggregate log compacting routine.

11. A method for aggregating the contents of accumulated change logs into an aggregate log and applying said aggregate log to update application data in a first client device of a data transfer and synchronization system, said method comprising the steps of:

downloading to the first client device a first change log of a plurality of change logs stored on a server system, each of said plurality of change logs reflecting transactions to said application data;

adding said first change log to an aggregate log on the first client device;

deleting said first change log;

repeating said downloading, adding, and deleting steps for a next change log of said plurality of change logs until no additional change logs exist; and applying said aggregate log to said application data to update said application data.

12. The method of claim 11 wherein the log includes an identifier for a change.

13. The method of claim 12 wherein the step of applying said aggregate log includes requesting a binary delta for a file.

14. The method of claim 11 further including the step of creating the aggregate log.

15. The method of claim 11 further including the step of closing the aggregate log.

16. The method of claim 11 further including the step of compacting said aggregate log.

17. The method of claim 16 wherein said step of compacting comprises:

iterating over each record in the aggregate log;

reading valid records; and writing valid records back to the aggregate log overwriting obsolete records.

18. A method of creating a composite change log on a client device, comprising:

downloading a first change log of a plurality of change logs from a server system, each of said plurality of change logs reflecting changes to said application data;

adding said first log to an aggregate change log, the aggregate change log comprising a summary of changes in said added change log and any previous change logs;

deleting said first change log; and repeating said downloading, adding, and deleting steps for a next change log of said plurality of change logs until no additional change logs exist.

* * * * *

UNITED STATES PATENT AND TRADEMARK OFFICE
CERTIFICATE OF CORRECTION

PATENT NO. : 6,925,476 B1  
APPLICATION NO. : 09/642615  
DATED : August 2, 2005  
INVENTOR(S) : Multer et al.

It is certified that error appears in the above-identified patent and that said Letters Patent is hereby corrected as shown below:

Col. 14, line 49: after "first" and before "log" insert --change--

Signed and Sealed this

Fifth Day of December, 2006

JON W. DUDAS  
*Director of the United States Patent and Trademark Office*